(12) United States Patent
Steinke et al.

(10) Patent No.: US 7,309,213 B2
(45) Date of Patent: Dec. 18, 2007

(54) WIND SAIL RECEPTOR

(75) Inventors: Richard A. Steinke, Boulder City, NV (US); John K. McGuire, LasVegas, NV (US)

(73) Assignee: Wind Sail Receptor, Inc., Boulder City, NV (US)

(*) Notice: Subject to any disclaimer, the term of this patent is extended or adjusted under 35 U.S.C. 154(b) by 122 days.

(21) Appl. No.: 11/270,403

(22) Filed: Nov. 7, 2005

(65) Prior Publication Data

US 2007/0104579 A1    May 10, 2007

(51) Int. Cl.
*B63H 1/06* (2006.01)

(52) U.S. Cl. ............... 416/197 A; 416/DIG. 2; 416/DIG. 6; 415/908

(58) Field of Classification Search ........... 415/2.1, 415/4.3, 4.5, 908; 416/197 A, 185, 243, 416/DIG. 2, DIG. 6
See application file for complete search history.

(56) References Cited

U.S. PATENT DOCUMENTS

| | | | |
|---|---|---|---|
| 207,189 A * | 8/1878 | Martin | 416/16 |
| 603,703 A * | 5/1898 | O'Connor | 416/200 R |
| 1,583,881 A * | 5/1926 | Heberling | 446/218 |
| 2,023,659 A | 12/1935 | Amico | |
| 2,098,107 A * | 11/1937 | Preston | 416/214 R |
| 2,102,913 A | 12/1937 | Preston | |
| D141,589 S | 6/1945 | Logsdon | |
| 4,019,828 A | 4/1977 | Bunzer | |
| 4,708,592 A | 11/1987 | Krolick et al. | |
| 4,779,006 A | 10/1988 | Wortham | |
| 4,915,580 A * | 4/1990 | Obidniak | 415/2.1 |
| 4,926,061 A | 5/1990 | Arreola, Jr. | |
| 5,437,541 A | 8/1995 | Vainrub | |
| 6,249,059 B1 | 6/2001 | Hosada | |
| 6,447,251 B1 | 9/2002 | Zeng | |
| 2001/0011825 A1 | 8/2001 | de Vega | |
| 2002/0070558 A1 | 6/2002 | Johann | |

* cited by examiner

*Primary Examiner*—Igor Kershteyn
(74) *Attorney, Agent, or Firm*—M. Reid Russell

(57) ABSTRACT

A wind sail receptor for turning in a wind or water flow to operate a power generator that includes from six to ten identical, equal spaced blades, that are formed from two flat sections of a stiff material and are arranged between a rear hub and spaced apart forward disk and fitted to a center axle that is journaled through a frame. The two sections are each formed into from three to five blades by removing portions therefrom, with the formed blades bent to curve from the rear hub to a blade side end that is coupled to the forward disk.

9 Claims, 6 Drawing Sheets

WIND SAIL RECEPTOR

BACKGROUND OF INVENTION

1. Field of the Invention

This invention pertains to wind mill blades, blades for turning by a water flow and blades for turning in water, that are for mounting to an axle for turning in a frame that is fitted to a tower to turn in the wind and produce a power output for doing work, or for turning in water.

2. Prior Art

The present invention is in a new and substantially more efficient wind powered blade structure than any presently available wind mill blade or blade arrangements. Examples of a variety of both old and new blade configurations are shown in U.S. patents to Logsoon, Des. No. 141,589; to Amico, U.S. Pat. No. 2,023,659; to Preston, U.S. Pat. No. 2,102,913; to Bunzer, U.S. Pat. No. 4,109,828; to Krolick, et al U.S. Pat. No. 4,708,592; to Wortham, U.S. Pat. No. 4,779,006; to Arreola, Jr., U.S. Pat. No. 4,926,061; to Vainrub, U.S. Pat. No. 5,437,541; to Hosoda, U.S. Pat. No. 6,249,059; and to Zeng, U.S. Pat. No. 6,447,251, as well as in published U.S. patent applications to Gericke de Vega, US2001/0011825 and to Johann, US2002/0070558. Unlike these and other known earlier blade configurations, the wind sail receptor design of the invention employs a pair of quad blades where each quad blade is formed from a continuous section of material, providing a stronger finished construction than is possible where individual blades are axially fitted together. In which fitting together, at equal distances around a front disk and rear hub, sail portions of the individual blades are equidistant from one another and overlap. Which blades spacing provides a uniform air flow path to a wind flow through the blades, and with each blade bent to function as a sail, functioning like a headsail or jib on a sail boat. The blade arrangement provides a greatly improved force of blade turning from even a light or variable wind in that the blades, when attached between the front disk and rear hub, are stiff and will efficiently derive energy from turning that is transferred into an axle connect between the blades front disk and rear hub, with that turning converted to useful energy, such as electrical energy, from a turning of a connected generated and with that produced energy to be stored in a battery or batteries, or can be directed into an electrical grid.

Heretofore, wind mill blade configurations have lack efficiency, particularly the blades as are turned in a wind farm operation, and operate at only an efficiency of approximately twenty (20), thereby utilizing only a small percentage of the energy of a wind passing through the blades, and, accordingly, have had to be large to produce a worthwhile energy output. Present day examples of such wind farm type blades are long, heavy blades, usually three blades, that are both expensive to construct and maintain, particularly as to bearing wear. The wind sail receptor of the invention unlike such wind farm blades, or blades like those shown in the above cited prior art, provide a substantially greater efficiency, of approximately ninety (90) percent in winds of from eight (8) to ten (10) miles per hour and greater, and utilizes a blade arrangement whose diameter is measured in inches rather than in feet. Such blade arrangement, of course, is far less expensive to construct and maintain, is a significantly more efficient than earlier blade configurations and is therefore a very significant improvement in wind power generation systems.

SUMMARY OF THE INVENTION

It is a principal object of the present invention to provide a wind sail receptor that has an arrangement of three to ten blades that are equally spaced and are connected axially, forming a blade arrangement of a wind powered device for converting wind energy into usable power.

Another object of the present invention is to provide, as a preferred blade arrangement, two sets of four equally spaced blades, that are connected axially, forming a single blade arrangement of a wind-powered device for converting wind energy into usable power.

Another object of the present invention to provide a wind sail receptor were the individual blades are each curved from a leading to trailing edge to perform a function like that of a sail, like that of a head sail or jib of a sailing ship, and which blades are equally spaced from one another around a forward disk to where a flow of air passing across each blade leading edge acts around the curve of the blade to efficiently convert wind energy into blade rotation and turn an axle or shaft extending from the trailing face of a rear hub, turning a power generation device.

Another object of the present invention is to provide a wind sail receptor where a trailing edge of each blade has an half round section proximate to a blade hub, that translates into a flat outer section that extends to the blade end, and is to provide a flow path for a wind traveling around the blade curved surface to discourage generation of turbulence in the flow at the blade trailing edge.

Still another object of the present invention is to provide a novel design of wind sail receptor blades that, by their construction from a light gauge material, will respond to an increase in wing speed by becoming more rigid making each blade suitable for turning in even a high wind and water.

Still another object of the present invention is to provide a wind sail receptor blade assembly having a minimum of one set of three to five blades, and preferably with two sets of blades forming a blade assembly of from six to ten blades, with the blade assemblies for axial assembly between an aligned forward disk and rear hub and with the individual blade bent around a selected arc and are attached, at equal spaced intervals to the forward disk, forming the three to ten equally spaced blades that overlap one another, providing uniform spacing between the blade leading edges, whereby an air or water flow will strike a curved blade portion, converting wind or water flow energy into blade turning, with the assembly to exhibit approximately a ninety (90) percent efficiency in a conversion of wind or water flow energy into blade turning.

Still another object of the present invention is to provide a wind sail receptor where each set of blades is formed from a flat section of light gauge material where the individual blades are formed by a removal or like spaced curved sections that extend from the center area of the flat section, out to the section edge, squaring off the blade outer end edges and connecting an outer edge end of each blade to a forward disk.

Still another object of the present invention is to provide a wind sail receptor that is simple and economical to produce where the single set or the two sets of blades are easily manufacture by stamping methods, and with the sets secured as a stack at their center rear hubs and with the individual blades formed by a connecting each blade outer edge end to a forward disk to form the wind sail receptor where the individual blades are equally spaced and including a shaft or axle fitted between the forward disk and rear hub to turn or be turned by a power producing device, producing a power output from the blade turning.

The present invention is in a unique wind sail receptor configuration for inclusion in a wind power or water operated system where blade turning converts wind or water flow energy into usable power, or where blade turning provides thrust through water. Two wind sail receptor segments of three to five blades each can be used, with a four-blade assembly being preferred and are herein referred to as a quad blade assembly, for forming the wind sail receptor assembly. The two segments of three to five blades each are fitted one over the other and connected at rear hub sections, with ends of each of the blades then bent through a selected arc as determined by the relationship of the axial spacing distance between the rear hub and forward disk and the blade length between which hub and its connection point to the forward disk, with the blade ends connected, at spaced intervals, around the forward disk. A shaft or axle is secured between the rear hub sections and forward disk, and that shaft is journaled between bearings in a frame or housing to allow the shaft or axle to be turned by blade turning responsive to an air of water flow through the blades, or the axle itself can be turned to turn the blades in water to generate thrust. Each blade segment is formed from a flat section of a stiff material, such as from light gauge steel, plastic, fiberglass or an elastomeric material, such as urethane. In practice, for forming each of the blade segments, like spaced sections corresponding to the number of blades to be formed in the section, are removed at equal intervals from the flat section of stiff material, with the removed sections extending from an outside edge to a point spaced apart from the flat section center that becomes the rear hub. A hole is formed in a dog leg bend of each blade of each of two blade segments, and each blade is bent through an arc that is determined from the ratio of the length of the axle between the rear hub and forward disk to the length of the blade between its hub and the blade's mounting to the forward disk at the hole in the blade dog leg bend. Which ratio, to form the b lade of the invention, requires that the axle length be approximately point seventy-five (0.75) to point eighty-five (0.85) of the blade length.

For an a six to ten bladed blade assembly, the pair of wind sail receptor sections are aligned over one another, and, with the rear hubs of each section aligned, each blade is bent through the arc determined by a ratio of the distance between the rear hub and front disk, with that hub to disk spacing ratio being from point seventy-five (0.75) to point eighty-five (0.85) of the blade length, connecting the blade dog leg bent to the forward disk, at one of spaced radial holes that are each equidistant from the center of which forward disk, forming the wind sail receptor. So arranged, for the six to ten blade assembly formed by the stack of two wind sail receptor segments, blade segment rear hubs are fitted over one another, aligning center holes through each. Which rear hubs holes align with a center hole formed through the forward disk to connect to an axle fixing the spacing distance therebetween as determined for the blade length. Which axle is journaled through bearings in a frame or mount, to be turned by a turning of the blade assembly to turn a power generation device, such as a generator. Or, where the blade assembly and axle are turned in a water flow to provide thrust, a motor or the like is connected to turn the axle. Where the blade assembly is turned by wind, the blade assembly, axle and frame the axle is mounted in, and the power generation device, For the preferred eight-blade assembly, the individual blades leading edges are spaced equidistantly apart approximately forty-five (45) degrees, and curve identically from the leading edge to a trailing edge that is itself curved outwardly from a lesser width across the blade end through approximately one hundred eighty (180) degrees to an end that butts against the blade rear hub. So arranged, the curved blade surface receives an air or water flow that passes between the adjacent blades that is essentially without turbulence and acts upon that curved area that functions like a head or jib sail, efficiently converting wind or water flow energy into blade turning. Which efficiency, in practice, is approximately ninety (90) percent efficient. The air or water flow, during its passage through the wind sail receptor is essentially turbulence free, with that flow smoothly directed over each blade surface to pass off of the outward curve formed as a trailing edge of the blade. In practice, for a wind sail receptor having a diameter of six (6) feet, a wind velocity of approximately eight (8) miles per hour directed into the wind sail receptor will produce approximately a megawatt of power. As a comparison, for a current three blade wind mill arrangement, to produce a like power output, the blade assembly diameter, across the hub must be approximately two hundred feet. Which wind mill will, of course, experience exponentially greater friction forces than those the six foot diameter wind sail receptor of the invention will experiences in like wind conditions. The wind sail receptor of the invention will, accordingly, have lesser maintenance requirements than such two hundred foot diameter wind mill, will be far cheaper to construct and maintain.

While a wind sail receptor formed from blade segments having three to five blades, forming a six to ten blade assembly, the invention can incorporate the single blade section of three to five equal spaced blades that are fitted to an axle and, which blade assembly will still function like, though not as efficiently, as the stack of blade sections that form the six to ten blade assembly, within the scope of this disclosure. The invention can be mounted in a frame where the wind sail receptor is mounted to an axle journaled therein to turn freely to receive an air flow directed therethrough. Further, the invention mounted onto an axle can be turned by a power source in water to produce an output thrust. Where the blade assembly of the invention is to be turned by a wind or water flow, a frame is appropriate to mount the axle between bearing, and where the wind sail receptor is for use as a wind mill, such frame will be preferably mounted to a pivot that, in turn, will be fitted to pivot on, a pole, tower, or the like. Such frame can be a half or full hoop, or the like, that includes side brackets for attachment between sides of a yoke that is fitted onto, to rotate freely on a pole, to weather vane into a wind. Which frame to also provide for mounting a power generating device, such as a generator, to be turned by the turning blade assembly, generating power that can be transmitted to a power storage device, such as a battery or batteries, or the like. Additionally, the frame, rearwardly from the blade assembly, can mount a rudder arrangement to provide for turning the frame around its yoke pivot mount to weather vane and position the blade assembly into the wind.

DESCRIPTION OF THE DRAWINGS

The invention may take physical form in certain parts and arrangement of parts, and a preferred embodiments of which will be described in detail in this specification and illustrated in the accompanying drawings which form a part hereof.

DETAILED DESCRIPTION

Figure 1:
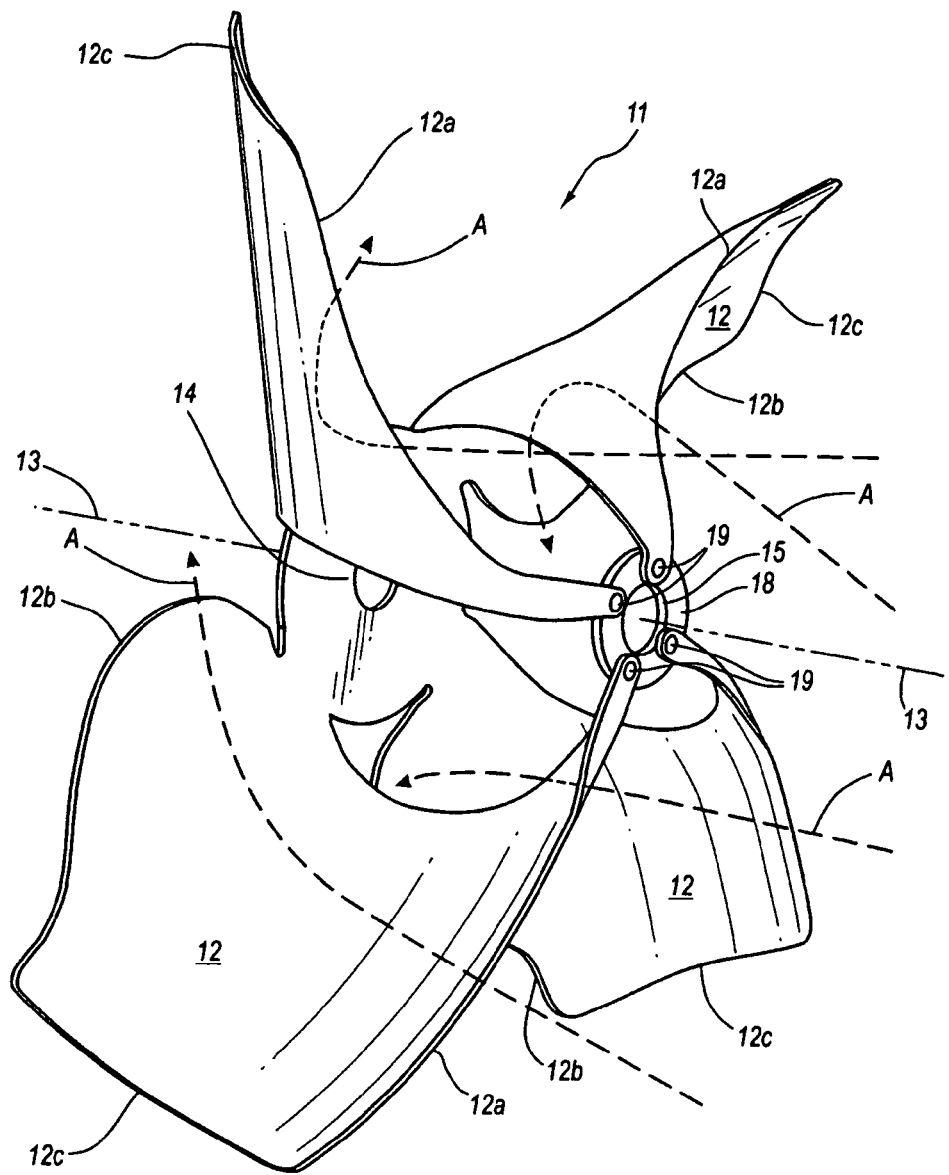
FIG. 1 shows a profile perspective view taken from a left side and front end of a single four-blade section of a wind sail receptor blade assembly of the invention, with arrows illustrating a flow of wind entering the front of the blade section, moving across each of the blades to exhaust off from the blades trailing edges.
Figure 3:
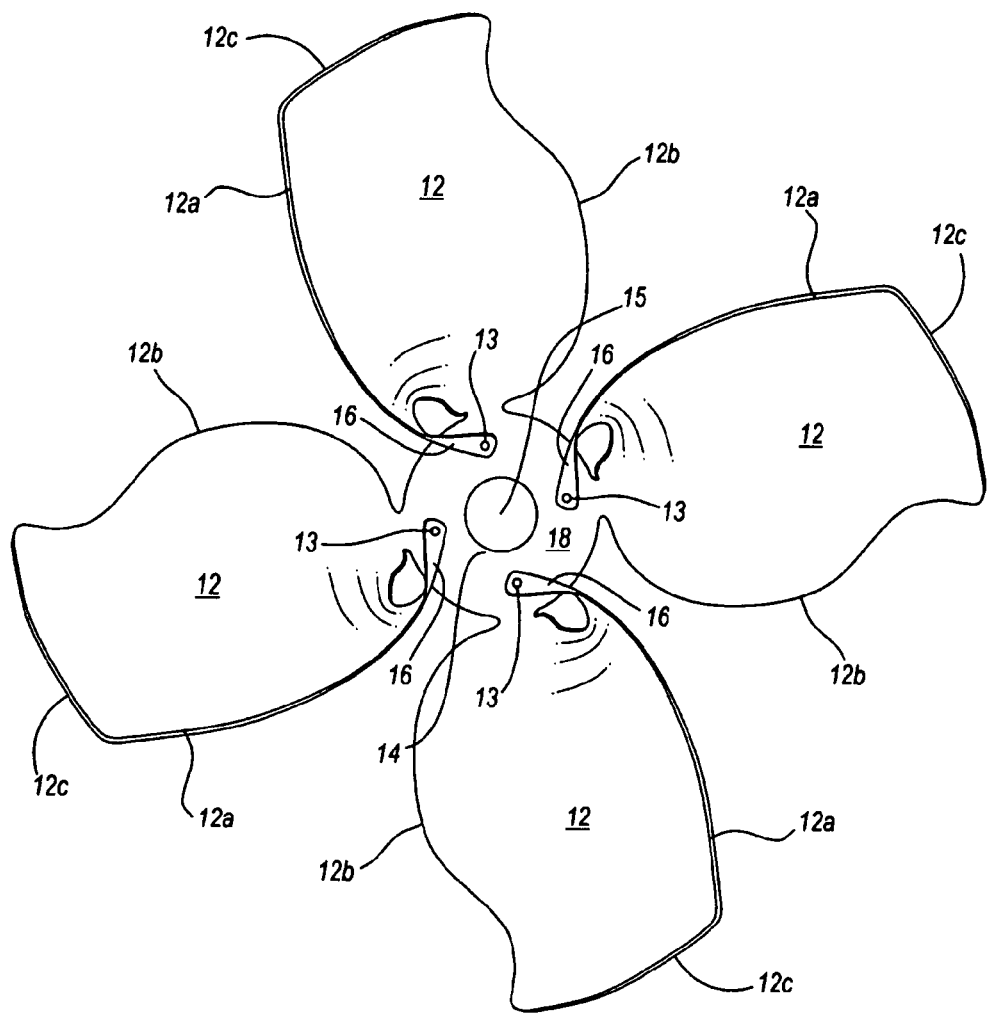
FIG. 3 shows the section of material of FIG. 2 after the blades have been bent to the attitude shown in FIG. 1 and with the blade ends connected at equal intervals around a forward disk that is shown as having a center hole formed therethrough.
Figure 4:
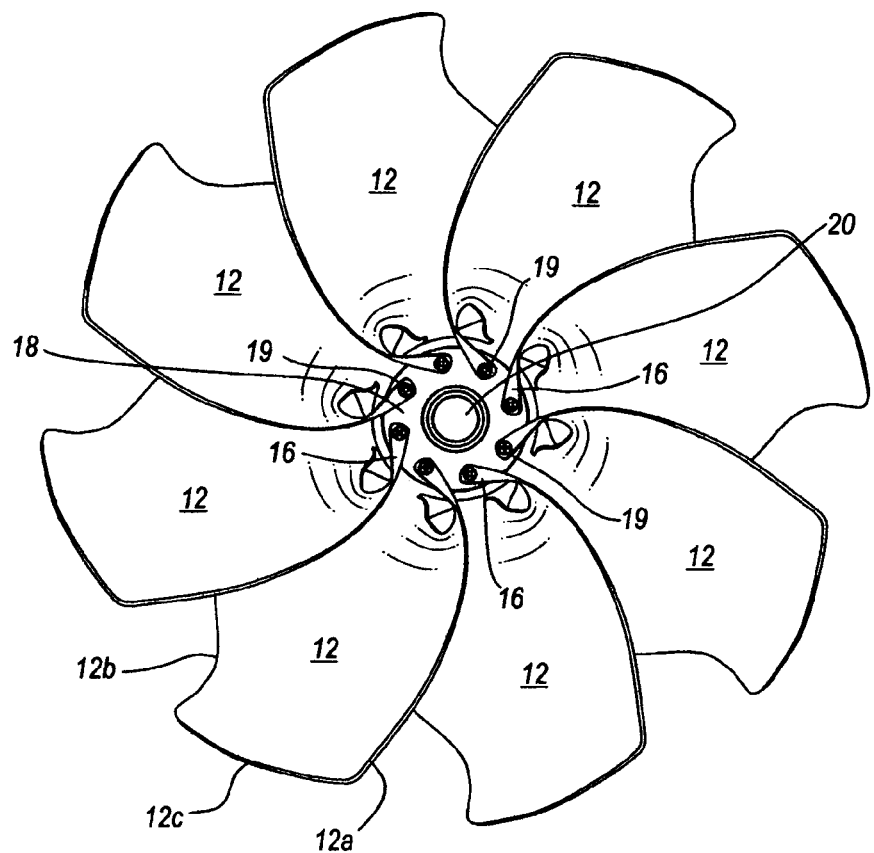
FIG. 4 shows a front elevation view of a preferred embodiment of an eight-blade wind sail receptor assembly of the invention that consists of two sections of wind sail receptor blade sections that, in their flat state of FIG. 2, have been overlaid and joined together at their rear hubs and have had their individual blades bent into the blade curve of FIG. 1 and secured at equal spaced radial intervals around a single forward disk.
Figure 5:
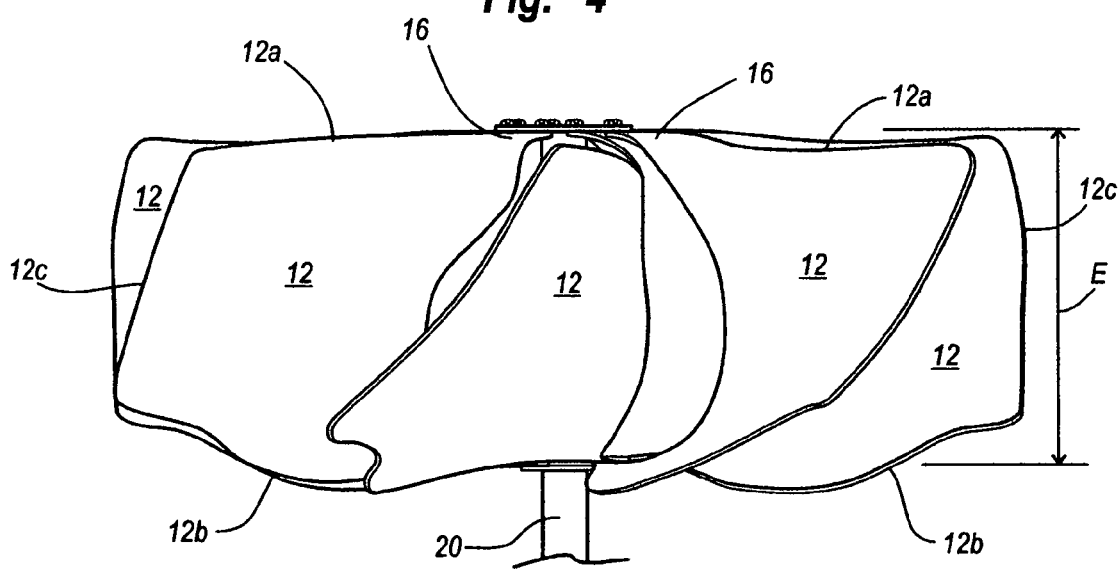
FIG. 5 is a side elevation view of the wind sail receptor of FIG. 4 showing an axle extending at a right angle outwardly from the joined rear hubs.
Figure 6:
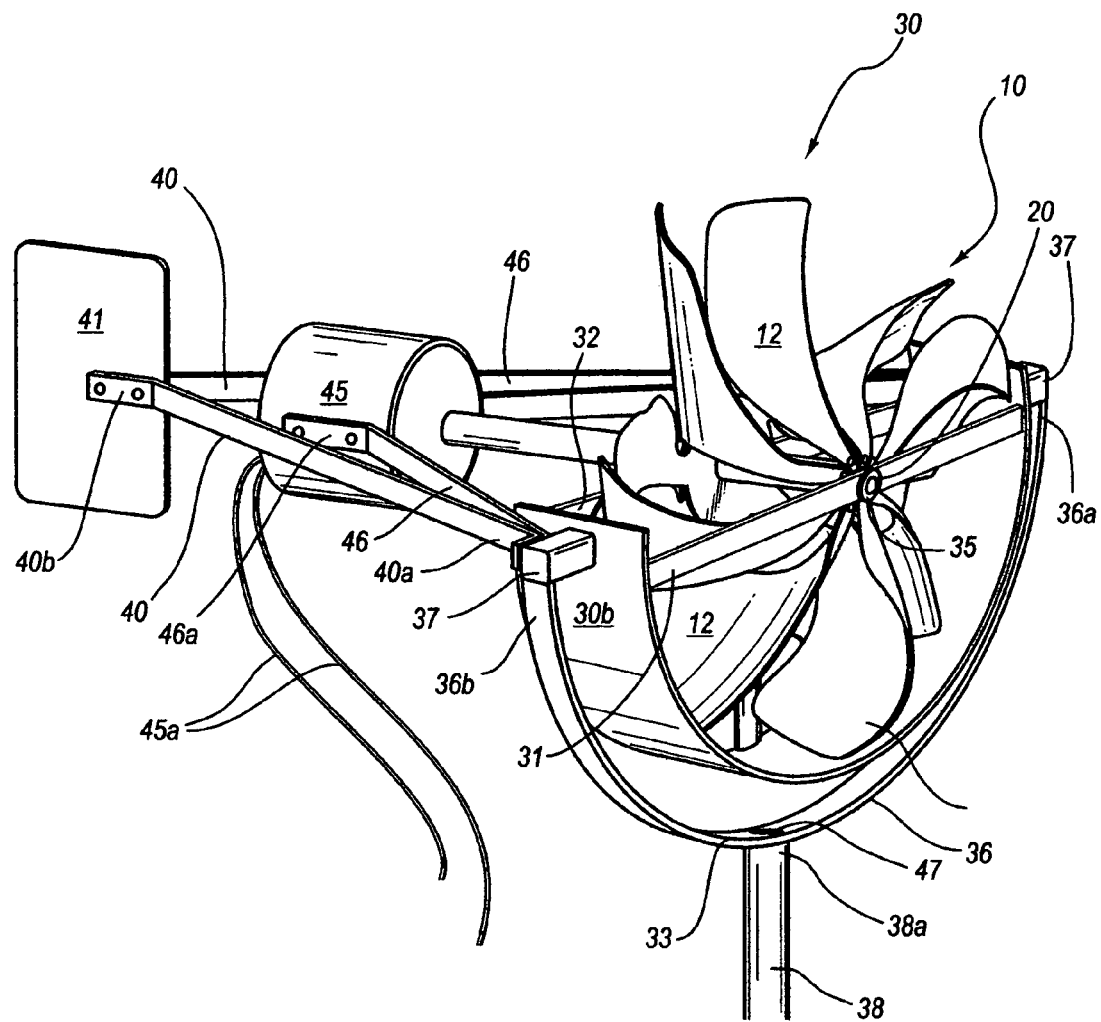
FIG. 6 is a front perspective view of the wind sail receptor of FIGS. 4 and 5 axially mounted between vertical supports of a half hoop shaped housing that is fitted to a yoke that is, in turn, mounted through a pivot collar to turn on a support pole, and showing a generator connected through braces to the half hoop shaped housing, with the generator axially connected at its rotor to a drive axle that is connected to and turned by the wind sail receptor, and showing a rudder attached by rudder braces to the half hoop shaped housing, rearwardly of the wind sail receptor to act as a weather vane to turn the pivot mounted yoke and connected half hoop shaped housing, with the wind sail receptor mounted to turn freely therein and weathervane into a wind.

The invention is in a wind sail receptor for turning, responsive to a flow of air therethrough, for producing usable power. FIG. 1 shows a single four blade section 111 of a wind sail receptor 10, as shown in FIGS. 4 through 6. Though, it should be understood, such single section 11 can consist of three to five blades, within the scope of this disclosure. In FIG. 1 arrows A are included to illustrate the flow of air around a curved portion of each of the identical blades 12, and which curve is illustrated by arrows B in FIG. 2, and is produced by bending each blade 12 between the rear hub 14 and end hole 13 in dog leg 16, shown as broken line D in FIG. 1, The bending to produce a curve or arc that is determined by a ratio of the distance between a rear hub 14 and forward disk 18, shown as broken line E in FIG. 5, referred to as axial distance, to the forward disk 18, forming the blade 12, as shown in FIGS. 1, 3 and 4. Which axial distance from the rear hub 14 to forward disk 18 ratio is from point seventy-five (0.75) to point eighty-five (0.85) of the blade length, taken from the rear hub 14 to a connection hole 13, shown in FIG. 2, that is on the end of a dog leg 16 and receives a fastener to connect the blade end to the forward disk at one of spaced radial holes by a screw 19, or like fastener, passed through holes 13 and turned into one of the forward disk holes. Which holes are each spaced equally apart and are equidistant from the center of which forward disk. The blade 12 curved portion is formed by bending each blade 12, as indicated by arrow C. The blade 12, to provide for which bending, includes the dog leg 16, that extends from a rear hub section 15 wherethrough a center hole 14 is formed. The blade dog leg 16 has the hole 13 formed therethrough, and the blade dog leg is bent, shown as arrows C, to where the hole 13 aligns over one of from three to ten equal spaced radial holes, with four spaced holes shown in FIG. 3, formed through forward disk 18, as shown in FIG. 1, to receive a fastener, like a screw 19, coupling the blade dog leg end 16 at hole 13 onto the forward disk 18, at the center of a forward end of the four blade section 11 of the wind sail receptor 10. The forward disk 18 and rear hub 15 are thereby spaced apart the selected distance for the length of blade 12 to produce the desired smooth curved surface therein. An axle 20 is rigidly mounted to the extend across the forward disk 18 to the rear hub, spanning the distance therebetween, and extending, at a right angle from the rear hub 15 center, and which axle can extend beyond the rear hub 14, as shown in FIG. 5, or out from the forward disk 18, for mounting through bearings to turn in a frame or housing, like the frame 30, shown in FIG. 6, and to connect to a power generating device, as discussed herein below with respect to FIGS. 6 and 7. Further, the wind sail receptor blade 10, it should be understood, can be arranged to be turned in water at axle 20 by a power source, such as a motor, not shown, to provide an output thrust, within the scope of this disclosure. Also, where the wind sail receptor 19 is shown in the drawings as being turned by wind, it should be understood that it can positioned in, to be turned by a liquid, such as water, within the scope of this disclosure.

Figure 2:
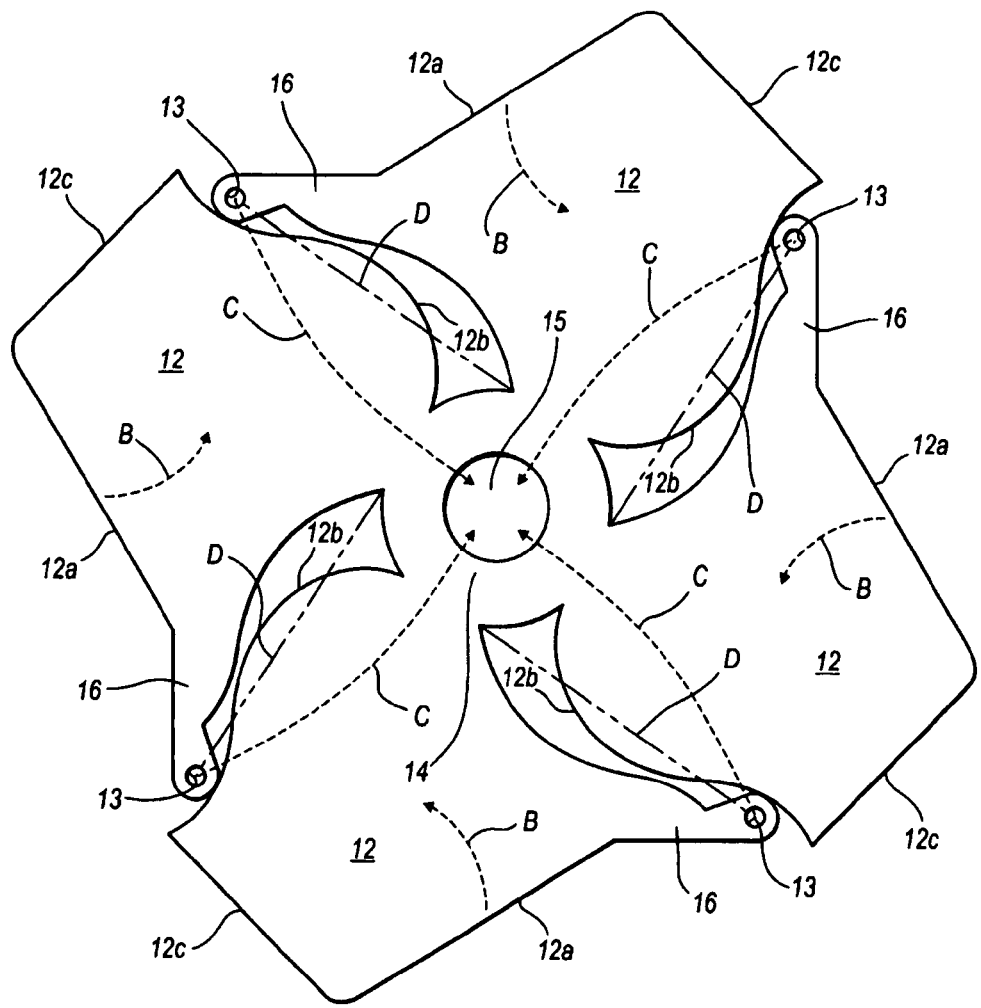
FIG. 2 shows a top plan view taken of a pair of a flat section of material that four radial sections of material have been removed from, leaving four like spaced apart blade portions extending outwardly from around a rear hub.

FIG. 2 shows the single section 11 of wind sail receptor 10 as a flat section that has been cut out of a flat piece of a flat stiff material. As shown, like sections of material are removed at spaced radial intervals from around the center of the section, leaving blades 12 forward or leading edges 12a, dog leg bend sides 16 with end holes 13 formed through the ends, rounded rear or trailing edges 12a, and with flat ends 12c. Which blades 12 are shown identically bent through smooth curves or arcs as shown in FIG. 2, and are connected, at radial points around, to a forward disk 18. Which connection can be made with fasteners 19 that are fitted through holes 13 formed at the ends of dog leg sections 16, producing the blade section 11 of FIGS. 1 and 3, as shown in FIG. 3. The blade single section 11 can be stamped out of a sheet of an appropriate material, such as a thin gauge steel, plastic or an elastomeric material, such as a polyurethane, or can be formed by casting, molding or other appropriate methods, within the scope of this disclosure.

As set out above, the invention involves the combination of the two single sections 11 that are fitted together at their rear hubs and with their blades 12 bent to and connected to the forward disk, forming the wind sail receptor 10, as shown in FIGS. 4 through 7. Which wind sail receptor 10, if three, four of five blade sections 11, are used would have six, eight or ten blades respectively. The invention, provides, in practice, approximately a ninety (90) percent and greater efficiency in a utilization of an air flow passing into and through the assembly. While an eight-blade 12 assembly is shown, it should be understood that an assembly of two sections to form an assembly of six, eight or twelve blades 12, is within the scope of this disclosure and will produce a much more efficient wind conversion device than any early wind mill assembly. Such wind sail receptor 10 provides for efficiently converting wind energy into rotational energy by turning a power generation device, such as a generator 45, shown in FIGS. 6 and 7. Though, it should be understood, a wind sail receptor 10 that includes a single section 11 only of three, four or five blades, can be used to convert wind energy into rotation of an axle 20 for turning a power generation device, within the scope of this disclosure.

FIG. 4 shows a top plan view of the wind sail receptor 10 of the invention, illustrating that, prior to bending of the blades 12, two of the single sections 11 are fitted together, one over the other, and with the rear hubs 14 of each secured together. So arranged, the blades 12 are equidistant from one another. Thereafter, the blades 12 are individually bent to a selected arc or curve, as set out above, and are each blade is connected to one of spaced radial holes formed in the forward disk 18 as with fasteners 19. The forward disk holes are equally spaced apart and are equidistant from the forward disk 18 center. The individual blades 12 dog leg sections 16 holes 13 are aligned with the forward disk 18 holes and screws 19, or like fasteners, are turned therein, securing the blades dog leg sections 16 to the forward disk 18. For the two four-blade sections 11, a spacing distance of approximately forty-five (45) degrees, is thereby provided between each of the eight blades 12 forward edges 12a, and the direction of that air flow through the blades is like that shown in FIG. 1 for the single section 11. Which air flow is directed around each blade 12, traveling across the blades, as shown by arrows A in FIG. 1, and off of the blades at trailing edge 12b. Air passage travels along and follows the blade arc or curve, with the blades functioning like a head or jib sail, converting approximately ninety (90) percent of the wind energy of an eight to ten mile per hour wind passed into blades 12. An axle 20, is shown in FIG. 5, that is secured to extend at a right angle from the center of the joined rear hubs 15, within the wind sail receptor 10, and connects through the center of the forward disk 18. The axle 20 provides for a spacing distance between which forward disk 18 and rear hubs 15 as relating to the blade length across the dog leg section 16 for determining blade curve or arc, as set out above, and may extend out from either, or both the forward disk 118 and rear hub 14 for mounting in bearings in a frame 30, shown in FIGS. 6 and 7 as a half hoop, and for turning a power generation assembly, like generator shown in FIGS. 6 and 7, for converting wind sail receptor 10 turning into a power output, as set out below.

Figure 7:
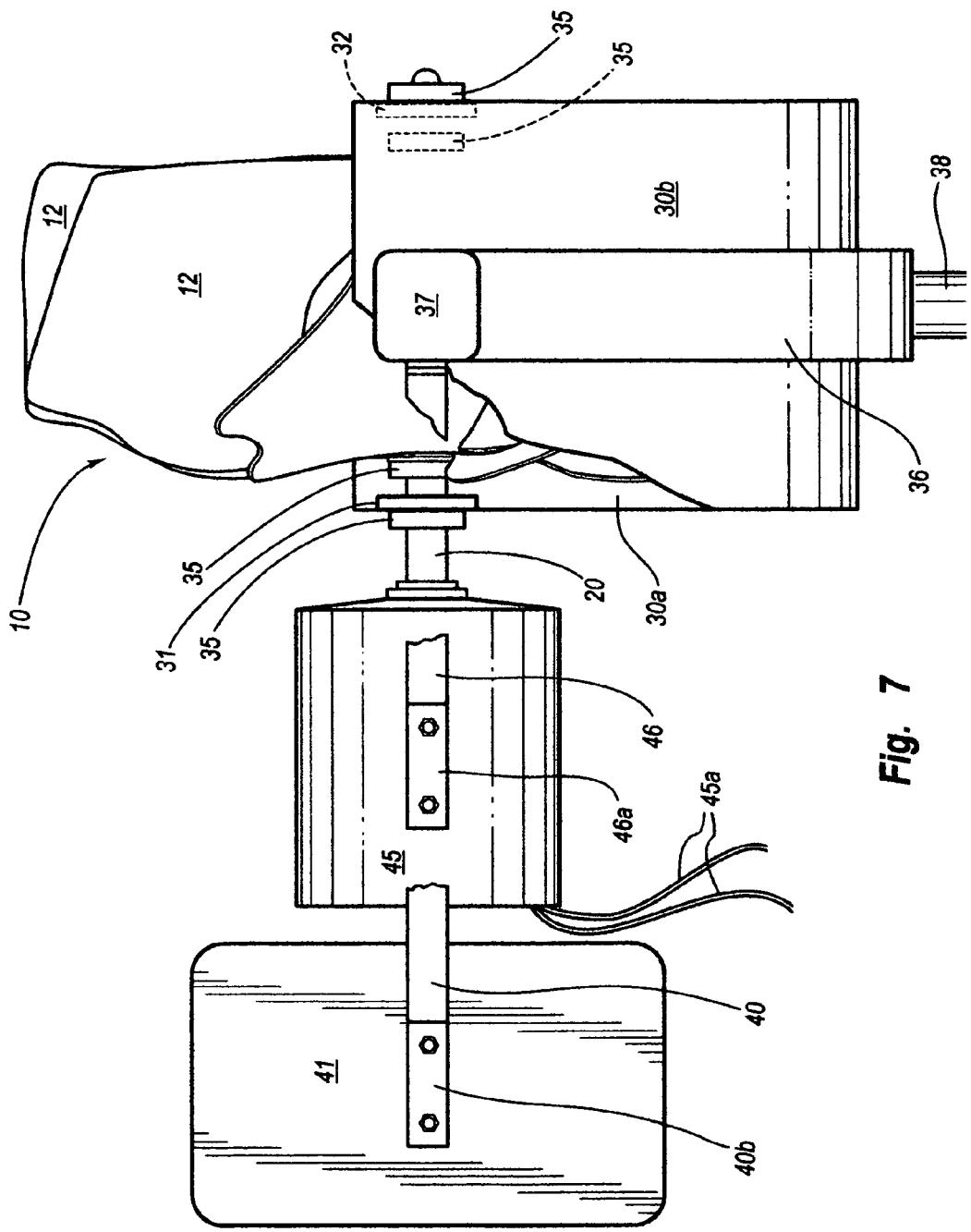
FIG. 7 shows a side elevation view of the assembly of FIG. 6 and showing wires from the generator for transmitting electrical energy generated by turning the wind sail receptor.

FIGS. 6 and 7 show the wind sail receptor 10 axle 20 connected to the forward disk 18 and rear hubs 15, and journaled through bearings 35, shown best in FIG. 7 that are mounted through forward and rear horizontal members 31 and 32, respectively, of a frame 30. Which frame 30 is shown as having a half hoop shape. As shown, the frame 30 forward horizontal member 31 is a bar that connects on its opposite ends to the tops of the half frame 30 forward edge 30a, and the rear horizontal member 32, is also a bar like the horizontal member 31 and connects at its opposite ends to opposite ends of the half frame 30 at a rear edge 33. To mount the frame 30 wherein the wind sail receptor 10 is journaled at bearings 35 to turn, the frame 30 includes a yoke 36 that is rigidly secured at its ends 36a to bottom or undersurfaces of brackets 37 that are secured, in horizontal alignment, to opposite sides of the outer surface 30b of frame 30, proximate to the frame ends. The yoke 36 further includes a straight male pole mount 38 that is secured at a top end 38a to the frame undersurface, extending at a right angle downwardly therefrom, and equidistant from the brackets 37. Which straight male pole mount 38 is for fitting into, to turn freely in, a head end of a pole, not shown, whose opposite end is mounted to support the pole in a vertical attitude, with the forward end of the wind sail receptor 10 facing into a wind.

To provide for wind sail receptor 10 positioning to face into a wind, the pivot mounting of the yoke male pole mount 38 to the pole head end is arranged to allow the wind sail receptor 10 and frame 30 to turn through three hundred sixty (360) degrees. Shown in FIGS. 6 and 7, to provide for which wind sail receptor 10 and frame 30 turning into a wind, the frame 30 includes braces 40 that are each connected on a forward end 40a to one of the brackets 37 and extend rearwardly to connect, on rear ends 40b, to opposite sides of a tail or rudder 41. The rudder 41, when acted upon by a wind, tends to weather vane into the wind, turning the frame 30 and wind sail receptor 10 into, to face into, that wind.

The wind sail receptor 10, facing into a wind, will be turned by that wind, turning also the axially connected axle 20 that, in turn, is connected to turn also a power generation device, converting wind energy into usable energy. While the wind sail receptor 10, can be connected to turn a number of power generation devices, for the purpose of this disclosure, FIGS. 6 and 7 show an electrical generator 45 mounted to ends 46a of struts 46 that, in turn, are secured to the rear surfaces of brackets 37, suspending the generator behind the wind sail receptor 10, and ahead of the rudder 41. So arranged, the generator 45 rotor, not shown, connects to, and is turned by, the wind sail receptor 10 axle 20. That rotor is turned in an armature winding or stator creating electrical current that is transferred through wires 45a to transfer a flow of electricity from the generator 45 to an electrical energy-operated device, not shown, to batteries, not shown, or into a power grid, not shown. While an electrical generator 45 is shown herein as a device that the wind sail receptor 10 of the invention can be connected to so as to produce a power output, it should be understood that other devices that are turned to produce an energy output could be used within the scope of this disclosure, and that the wind sail receptor is suitable for turning in a liquid flow, such as water, and for turning in a liquid, such as water, to generate thrust.

Where the wind sail receptor 10 preferably includes the pair of wind sail receptor sections 11 that are axially connected together, it should be understood that a single wind sail receptor section 11 can be utilized to produce wind power, within the scope of this disclosure. Such single section 11, would not, however, be as efficient in operation as is the pair of sections 11 arranged as the wind sail receptor 10.

A preferred embodiment of the wind sail receptor of the invention has been shown and described above. It will, however, be apparent to one knowledgeable or skilled in the art that the above described embodiment may incorporate changes and modifications without departing from the general scope of this invention. Which invention is therefore intended to include all such modifications and alterations in so far as they come within the scope of the appended claims and/or a reasonable equivalence thereof.

We claim:

1. A wind sail receptor comprising, first and second wind sail receptor blade sections that each have from three to five radially spaced identical blades, and said wind sail receptor sections are stacked and connected at their centers, forming a centered rear hub, and said blades are each formed to have an essentially straight leading edge with a rounded trailing edge that is adjacent to an inner end that is connected to the rear hub and terminates, at an outer end, in a straight edge that extends to said blade end, and each blade has a selected curve across their mid section that is determined by a relationship where the axial distance between the rear hub and a forward disk that is less than one to the length of a blade side from its connection to said rear hub to a blade end that is coupled to said forward disk; with ends of each blade opposite to its connection to said rear hub secured, at equal radial intervals, to equal spaced points around said forward disk; an axle secured to said wind sail receptor sections rear hub and forward disk and extends out from either or both said rear hub and forward disk; bearing means for mounting said axle to turn freely; and means, connected to turn or be turned by said axle.

2. The wind sail receptor as recited in claim 1, wherein the selected curve of each identical blade of each wind sail receptor section is determined by the relationship of the axial distance between the rear hub and a forward disk that is from zero point seventy-five (0.75) to zero point eight-five (0.85) to the length of the blade side from its connection to said rear hub to the blade end coupling to said forward disk.

3. The wind sail receptor as recited in claim 2, wherein ends of each of the identical blades terminate in a straight end section that extends from the blade leading to trailing edges.

4. The wind sail receptor as recited in claim 1, wherein leading edges of the identical blades at their inner ends are secured to each of equal spaced radial holes that are formed in the forward disk.

5. The wind sail receptor as recited in claim 1, wherein the identical blades are formed from like sections of a thin gauge stiff material.

6. The wind sail receptor as recited in claim 5, wherein the thin gauge stiff material is sheet steel.

7. The wind sail receptor as recited in claim 5, where the thin gauge material is a sheet of polyurethane material.

8. The wind sail receptor as recited in claim 1, wherein the wind sail receptor axle is mounted through the bearings to a frame that is, in turn, pivotally mounted onto a tower to turn when a liquid flow is directed into said wind sail receptor; and said frame includes a rudder or fin means arranged rearwardly from the wind sail receptor to weathervane said wind sail receptor to face into said liquid flow.

9. The wind sail receptor as recited in claim 1, wherein the frame mounts a power generation means that is turned by the wind sail receptor axle; and a means for power transfer is provided that is connected to said power generation means to transfer power from turning of said wind sail receptor for use or storage.

* * * * *